Sept. 14, 1954  E. JAULMES  2,689,012
CLUTCH FOR PEDAL CYCLES HAVING AUXILIARY MOTORS
Filed Sept. 20, 1950  2 Sheets-Sheet 1

INVENTOR
ERIC JAULMES

BY Young, Emery & Thompson

ATTORNEYS

Sept. 14, 1954 E. JAULMES 2,689,012
CLUTCH FOR PEDAL CYCLES HAVING AUXILIARY MOTORS
Filed Sept. 20, 1950 2 Sheets-Sheet 2

INVENTOR
ERIC JAULMES

BY Young, Emery & Thompson

ATTORNEYS

Patented Sept. 14, 1954

2,689,012

UNITED STATES PATENT OFFICE 2,689,012

CLUTCH FOR PEDAL CYCLES HAVING AUXILIARY MOTORS

Eric Jaulmes, Paris, France, assignor to Ateliers de la Motobecane, Pantin (Seine), France, a French corporation Application September 20, 1950, Serial No. 185,836

Claims priority, application France September 29, 1949

4 Claims. (Cl. 180—33)

1

In a pedal cycle with an auxiliary motor it is generally unnecessary to provide a clutch which can be operated while the cycle is being ridden, but it is sometimes convenient, say on a long descent, or if the motor breaks down, to be able to uncouple the motor from the rear wheel.

According to the present invention the crank axle of such a cycle carries a freely turning pulley and a freely turning sprocket, the pulley being connected to the motor by a belt and the sprocket being connected to the rear wheel by a chain and one or more movable bolts are provided by which the pulley and sprocket may at will be coupled together.

Preferably the sprocket carrying the chain is one of a pair of sprockets on a single boss, the second sprocket being engaged at will by bolts carried in the pulley, and having teeth which can be cut in the same operation as those of the first sprocket.

The accompanying drawings show by way of example, two constructions according to the present invention. In these drawings.

Figure 1:
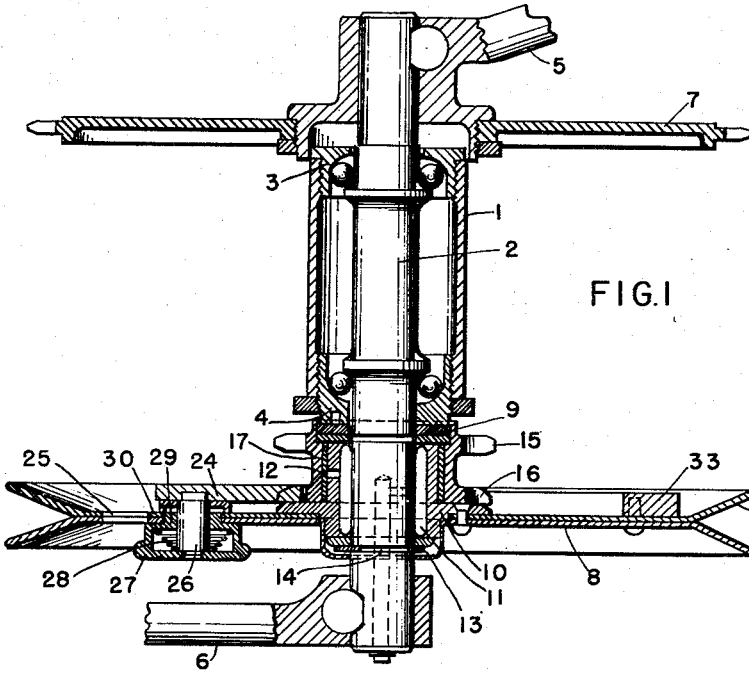
Figure 1 is a section through one construction on the axis of the crank axle.
Figure 2:
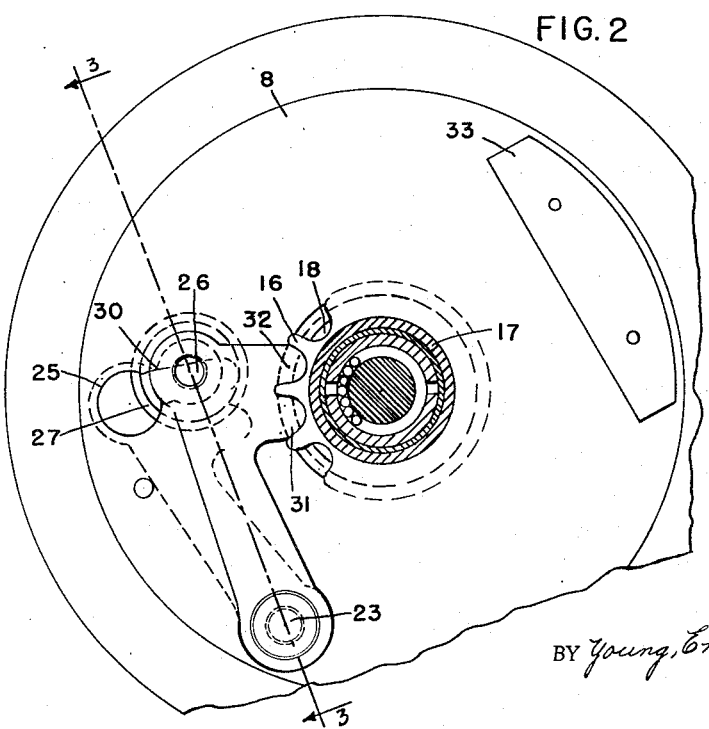
Figure 2 is an elevation of the inner face of the pulley.
Figure 3:
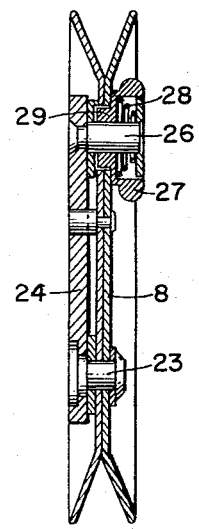
Figure 3 is a section on the line 3—3 in Figure 2.

In the construction shown in Figures 1 to 3, a crank axle 2 is journalled in ball bearings 3 and 4 in the bottom bracket 1 of the cycle. The crank axle 2 carries cranks 5 and 6 secured by cotters, and the boss of the crank 5 carries a sprocket wheel 7 by which drive is transmitted from the pedals to the rear wheel.

Between the crank 6 and the bearing 4, the crank axle carries a V belt pulley 8 and a sprocket 9 forming part of the transmission between an auxiliary motor and the rear wheel. The hub 10 of the pulley 8 can turn on the crank axle 2 on a needle bearing 11 and the sprocket 9 can turn on the hub 10 on an anti-friction ring 12. The hub 10 is located axially on the axle 2 by a split ring 13 engaging a groove in the axle.

The sprocket 9, which is coupled by a chain to the rear wheel, is one of a pair of sprockets on the same boss 17. The teeth of both sprockets are cut in the same operation, but while the teeth 15 of the sprocket 9 are of full height, the teeth 16 of the second sprocket are shorter and separated by arcuate spaces 18.

The pulley 8 which is coupled by a belt to the

2 crankshaft of the auxiliary motor carries a single bolt 24 swinging radially. This bolt is pivoted to the web of the pulley 8 at 23 and carries two teeth 31 and 32 which can engage the teeth 16 which in this construction are of full height. Two such bolts can be provided, but one is found to be sufficient, and the balance of the pulley 8 is maintained by a weight 33.

The bolt 24 carries a pin 26 lying in a dumbbell shaped slot 25 in the web of the pulley 8. On the pin is a knob 27 loaded by a spring 28. At the limits of movement of the bolt 24, a spigot 29 on the knob 27 enters the enlarged ends 30 of the slot 25.

Figure 4:
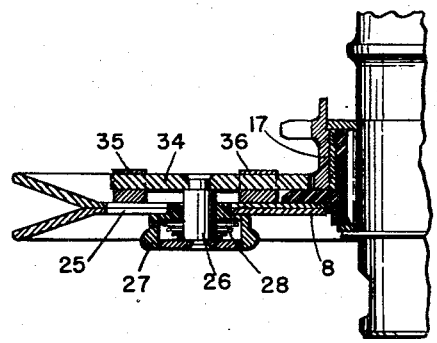
Figures 4 and 5 are views similar to Figures 1 and 2 of the second construction.
Figure 5:
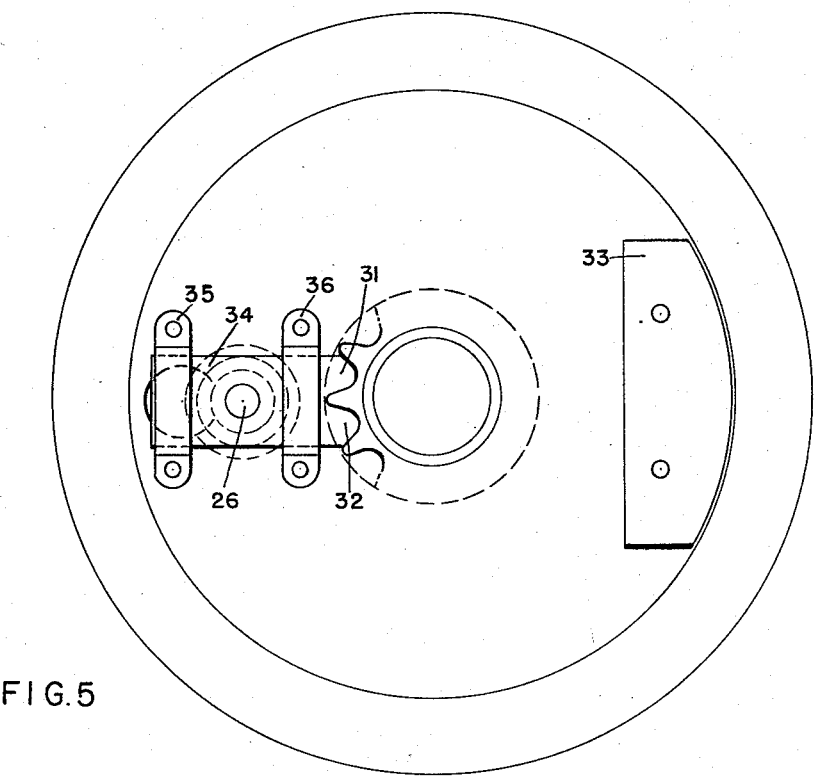

The construction shown in Figures 4 and 5 resembles that shown in Figures 1 to 3 but the bolt 34 reciprocates radially in guides 35 and 36.

In both the first and second constructions the teeth 31 and 32 act as wedges and bring the pulley 8 and sprocket 9 into the correct relative angular position as the bolt is moved into engagement.

Having now particularly described and ascertained the nature of my said invention and in what manner the same is to be performed, I declare that what I claim is:

1. In a pedal and motor driven cycle having a crank axle carrying a manual driving sprocket, an intermediary transmission freely mounted on the crank axle, opposite said manual driving sprocket, said transmission comprising a pulley freely mounted on the crank axle and driven by the motor, a power sprocket coaxial with said pulley and driving the rear wheel through a chain, an auxiliary sprocket integral with said power sprocket and having identical teeth, and radially movable, hand actuated locking means mounted on the pulley and provided with teeth for entering the spaces between the teeth of the auxiliary sprocket, for the coupling and uncoupling of said pulley with the power sprocket.

2. In a pedal and motor driven cycle having a crank axle carrying a manual driving sprocket, an intermediary transmission freely mounted on the crank axle, opposite said manual driving sprocket, said transmission comprising a pulley freely mounted on the crank axle and driven by the motor, a power sprocket coaxial with said pulley and driving the rear wheel through a chain, an auxiliary sprocket integral with said power sprocket, and radially movable, hand actuated locking means mounted on the pulley and provided with teeth for entering the spaces between the teeth of the auxiliary sprocket, for the coupling and uncoupling of said pulley with the power sprocket, said locking means including an arm mounted on the pulley, on a pivot parallel will the crank axle, the teeth of said locking means entering said spaces being formed at the free end of said arm.

3. In a pedal and motor driven cycle having a crank axle carrying a manual driving sprocket, an intermediary transmission freely mounted on the crank axle, opposite said manual driving sprocket, said transmission comprising a pulley freely mounted on the crank axle and driven by the motor, a power sprocket coaxial with said pulley and driving the rear wheel through a chain, an auxiliary sprocket integral with said power sprocket, and a radially movable, hand actuated locking means mounted on the pulley and provided with teeth for entering the spaces between the teeth of the auxiliary sprocket, for the coupling and uncoupling of said pulley with the power sprocket, said locking means including an arm mounted on the pulley, on a pivot parallel with the crank axle for guiding the locking member in its radial movements, said pulley having a radially extending dumbbell shaped slot formed in the web thereof, an actuating knob carried by the locking member and having a portion releasably engageable in the enlarged portions of the dumbbell slot, and resilient means urging said knob to a position to enter the dumbbell slot.

4. In a pedal and motor driven cycle having a crank axle carrying a manual driving sprocket, an intermediary transmission freely mounted on the crank axle, opposite said manual driving sprocket, said transmission comprising a pulley freely mounted on the crank axle and driven by the motor, a power sprocket coaxial with said pulley and driving the rear wheel through a chain, an auxiliary sprocket integral with said power sprocket, and radially movable, hand actuated locking means mounted on the pulley and provided with teeth for entering the spaces between the teeth of the auxiliary sprocket for the coupling and uncoupling of said pulley with the power sprocket, said locking means including an element radially slidably mounted on the pulley, said pulley having a radially extending dumbbell shaped slot formed in the web thereof, an actuating knob carried by the locking member and having a portion releasably engageable in the enlarged portions of the dumbbell slot, and resilient means urging said knob to a position to enter the dumbbell slot.

References Cited in the file of this patent

UNITED STATES PATENTS

| Number | Name | Date |
| --- | --- | --- |
| 214,246 | Fish | Apr. 15, 1879 |
| 326,994 | Lafever | Sept. 29, 1885 |
| 667,062 | Clemens | Jan. 29, 1901 |
| 2,015,587 | Bready | Sept. 24, 1935 |
| 2,397,858 | Hare | Apr. 2, 1946 |

FOREIGN PATENTS

| Number | Country | Date |
| --- | --- | --- |
| 218,831 | Switzerland | Apr. 16, 1942 |